(12) United States Patent  (10) Patent No.: US 6,435,839 B1
Erbes  (45) Date of Patent: Aug. 20, 2002

(54) JET PUMP SENSING LINE CLAMP ASSEMBLY AND METHODS (75) Inventor: John Geddes Erbes, Mt. View, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/683,108

(22) Filed: Nov. 19, 2001

(51) Int. Cl.[7] .............................. F04B 49/00; F16C 1/10
(52) U.S. Cl. .................... 417/63; 376/247; 376/372; 403/384; 248/73; 248/74.3
(58) Field of Search ............... 269/37, 43; 248/74.1, 248/68.1, 227.3; 403/373, 374; 417/63, 151, 189; 376/247, 302, 372

(56) References Cited

U.S. PATENT DOCUMENTS

| | | | |
|---|---|---|---|
| 1,877,781 A | * 9/1932 | Akerlund | 248/72 |
| 2,856,244 A | * 10/1958 | Menshen | 248/67.5 |
| 4,675,149 A | 6/1987 | Perry et al. | 376/260 |
| 5,024,405 A | * 6/1991 | McGuire | 248/73 |
| 5,502,754 A | * 3/1996 | Erbes | 376/302 |
| 5,752,807 A | 5/1998 | Erbes | 417/63 |
| 5,803,654 A | * 9/1998 | Spease et al. | 403/384 |
| 5,890,685 A | * 4/1999 | Takahashi | 248/74.3 |
| 6,053,652 A | * 4/2000 | Deaver et al. | 403/24 |
| 6,233,301 B1 | 5/2001 | Robergeau | 376/302 |

* cited by examiner

Primary Examiner—Charles T. Jordan
Assistant Examiner—Daniel Matz
(74) Attorney, Agent, or Firm—Armstrong Teasdale LLP (57) ABSTRACT

A clamp assembly for a jet pump sensing line adjacent a jet pump within a nuclear reactor pressure vessel. The jet pump sensing line includes a support block. The clamp assembly includes a clamp body, a clamp member coupled to the clamp body, and a slide member coupled to the clamp body. The clamp assembly further includes a clamp bolt, a swing arm bolt, and a swing arm coupled to the slide member. The swing arm and the slide member are sized to receive and secure the sensing line and the clamp member. The clamp member and the clamp body are sized to secure the clamp assembly to the jet pump.

30 Claims, 6 Drawing Sheets

JET PUMP SENSING LINE CLAMP ASSEMBLY AND METHODS

BACKGROUND OF INVENTION

This invention relates generally to nuclear reactors and more particularly, to apparatus for securing jet pump sensing lines within a nuclear reactor pressure vessel.

A reactor pressure vessel (RPV) of a boiling water reactor (BWR) typically has a generally cylindrical shape and is closed at both ends by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically shaped shroud.

In a BWR, hollow tubular jet pumps positioned within the shroud annulus provide the required reactor core water flow. Water, generally under high pressure, flows through the jet pump diffuser from the smaller diameter end to the larger diameter end. The water exits the diffuser at the larger diameter end and is discharged through the adapter assembly into the lower core plenum for circulation through the reactor. The pressure drop in the water flowing through the diffuser is continually monitored. Relatively small pressure sensing lines are mounted to the exterior of each diffuser, and are in fluid communication with the water in the jet pump through the wall of the diffuser so that the pressure may be sensed.

The flow through and around the jet pump contains pressure fluctuations from various sources in the reactor. The pressure fluctuations can have frequencies close to one or more natural vibration modes of the sensing line piping depending on the spacing and stiffness of welded supports attaching the sensing line piping to the jet pump. Particularly, in some known jet pumps, there is a relatively long unsupported length of the sensing line routing from a radiused bend below a lower support block to an anchor point at the next adjacent jet pump. When an excitation frequency is close to matching the sensing line natural frequency at some particular location, vibration of the sensing line exerts loads on its support attachments which can cause cyclic fatigue cracking and failure of both the piping and the welded attachments to the supports. This can result in loss of the indication of core flow, which if it occurs at enough locations, may require plant shutdown. Additionally, in some known plants, licensing changes implement an uprate of the maximum power generated by the plant. The associated increased reactor flow may produce higher excitation frequencies that introduce new resonant vibration response and fatigue failure in the sensing line pipe or its attachments. The following devices are designed to provide an additional sensing line support at a new location such that the natural frequencies of the sensing line are altered to avoid resonance with system excitations.

U.S. Pat. No. 4,675,149 describes a ring and beam clamp supports to provide attachment of the sensing line to the jet pump diffuser. The clamp surrounds the jet pump diffuser to hold the beam assemblies clamped to the sensing line against a spacer fitted against the diffuser wall. Installation requires remote precise measurement of the sensing line position, field trim of the beam spacer to fit, and remote assembly of the beam to the clamp and the jet pump. Also, to allow access for installation, requires disassembly of the jet pumps, which is an added undesirable expense and extension of the reactor outage time.

Another method of attaching or re-attaching the sensing line to the jet pump diffuser uses two bolts to attach a local pipe clamping assembly through holes machined in the diffuser. This clamp design still requires jet pump disassembly for installation access.

U.S. Pat. No. 5,752,807 describes a compact support attachment, utilizing a T-bolt type of blind fastener to clamp the sensing line to the jet pump. This design does not require jet pump disassembly, but does require additional time for machining of a T-slot opening in the diffuser for attachment. U.S. Pat. No. 6,233,301 describes an electrical discharge machining apparatus for machining the T-slot openings in the diffuser.

SUMMARY OF INVENTION

In one aspect, a clamp assembly for a jet pump sensing line in a nuclear reactor is provided. The clamp assembly includes a clamp body having a bolt cavity, a clamp member coupled to the clamp body, and a clamp bolt sized to be received in the clamp body bolt cavity. The clamp member is configured to extend partially around the jet pump. The clamp assembly further includes a slide member having a bolt receiver and a sensing line receiver, a swing arm having a sensing line recess, and a swing arm bolt sized to be received in the slide member bolt receiver. The slide member is coupled to the clamp body. The swing arm sensing line recess and the slide member sensing line receiver are sized to receive and secure the sensing line, and the clamp member and the clamp body are sized to secure the clamp assembly to the jet pump.

In another aspect, a jet pump assembly is provided. The jet pump assembly includes an inlet mixer, a diffuser coupled to the inlet mixer, a sensing line positioned adjacent said diffuser by a support block; and a clamp assembly. The clamp assembly includes a clamp body having a bolt cavity, a clamp member coupled to the clamp body, and a clamp bolt sized to be received in the clamp body bolt cavity. The clamp member is configured to extend partially around the jet pump. The clamp assembly further includes a slide member having a bolt receiver and a sensing line receiver, a swing arm having a sensing line recess, and a swing arm bolt sized to be received in the slide member bolt receiver. The slide member is coupled to the clamp body. The swing arm sensing line recess and the slide member sensing line receiver are sized to receive and secure the sensing line, and the clamp member and the clamp body are sized to secure the clamp assembly to the jet pump.

In another aspect, a method of clamping a jet pump sensing line to a jet pump within a nuclear reactor pressure vessel, using a clamp assembly is provided. The sensing line includes a support block, and the clamp assembly includes a clamp body, an extended clamp strut, a clamp member, a clamp bolt, a slide member, a swing arm and a swing arm bolt. The method includes positioning the clamp assembly to receive the sensing line in the slide member, positioning the clamp member around the jet pump, positioning the clamp strut adjacent the support block, rotating the clamp bolt to slide the clamp body into contact with the jet pump, to clamp the jet pump between the clamp member and the clamp body, and rotating the swing arm into contact with the sensing line so that the sensing line is secured between the swing arm and the slide member.

DETAILED DESCRIPTION

A jet pump sensing line clamp assembly is described below in more detail. The clamp assembly provides remotely installable sensing line supports located to reduce unsupported span lengths in the sensing line and to increase the natural frequency by using rigid clamped attachments between the sensing line and the jet pump diffuser. The clamp assembly also provides for reliable installation in a minimum installation time and limited access space without requiring disassembly of the jet pumps.

Figure 1:
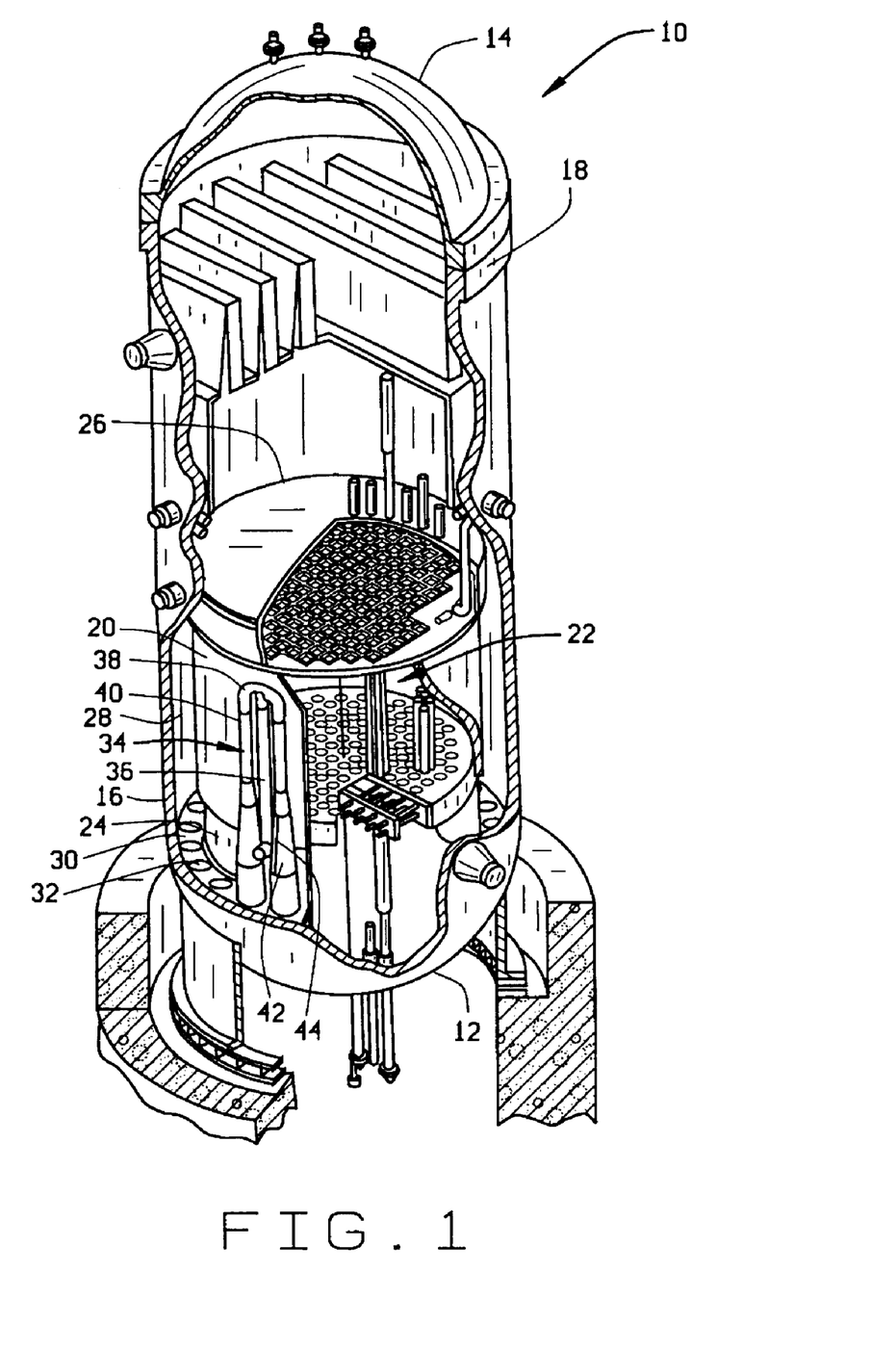
FIG. 1 is a sectional view, with parts cut away, of a boiling water nuclear reactor pressure vessel.

Referring now specifically to the drawings, FIG. 1 is a sectional view, with parts cut away, of a boiling water nuclear reactor pressure vessel (RPV) 10. RPV 10 has a generally cylindrical shape and is closed at one end by a bottom head 12 and at its other end by a removable top head 14. A side wall 16 extends from bottom head 12 to top head 14. Side wall 16 includes a top flange 18. Top head 14 is attached to top flange 18. A cylindrically shaped core shroud 20 surrounds a reactor core 22. Shroud is supported at one end by a shroud support 24 and includes a removable shroud head 26 at the other end. An annulus 28 is formed between shroud 20 and side wall 16. A pump deck 30, which has a ring shape, extends between shroud support 24 and RPV side wall 16. Pump deck 30 includes a plurality of circular openings 32, with each opening housing a jet pump 34. Jet pumps 34 are circumferentially distributed around core shroud 20. An inlet riser pipe 36 is coupled to two jet pumps 34 by a transition assembly 38. Each jet pump 34 includes an inlet mixer 40, and a diffuser 42. A sensing line 44, in fluid communication with diffuser 42 is mounted to jet pump 34.

Figure 2:
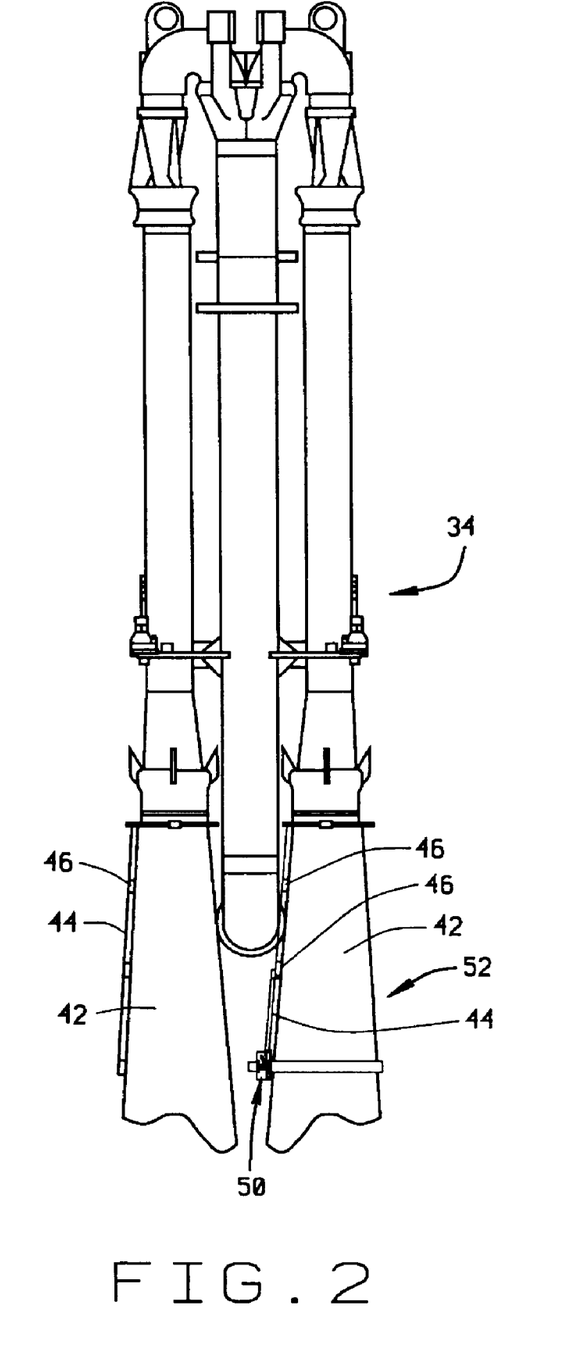
FIG. 2 is a perspective view, with parts cut away, of a jet pump shown in FIG 1.

FIG. 2 is a perspective view, with parts cut away, of jet pump 34. Sensing line 44 is mounted to jet pump 34 by a plurality of support blocks 46. A clamp assembly 50 clamps sensing line 44 to diffuser 42. Jet pump 34, sensing line 44, support blocks 46, and clamp assembly 50 form a jet pump assembly 52. In one embodiment, clamp assembly 50 extends partially around diffuser 42 clockwise from sensing line 44. In another embodiment clamp assembly 50 extends counterclockwise around diffuser 42.

Figure 3:
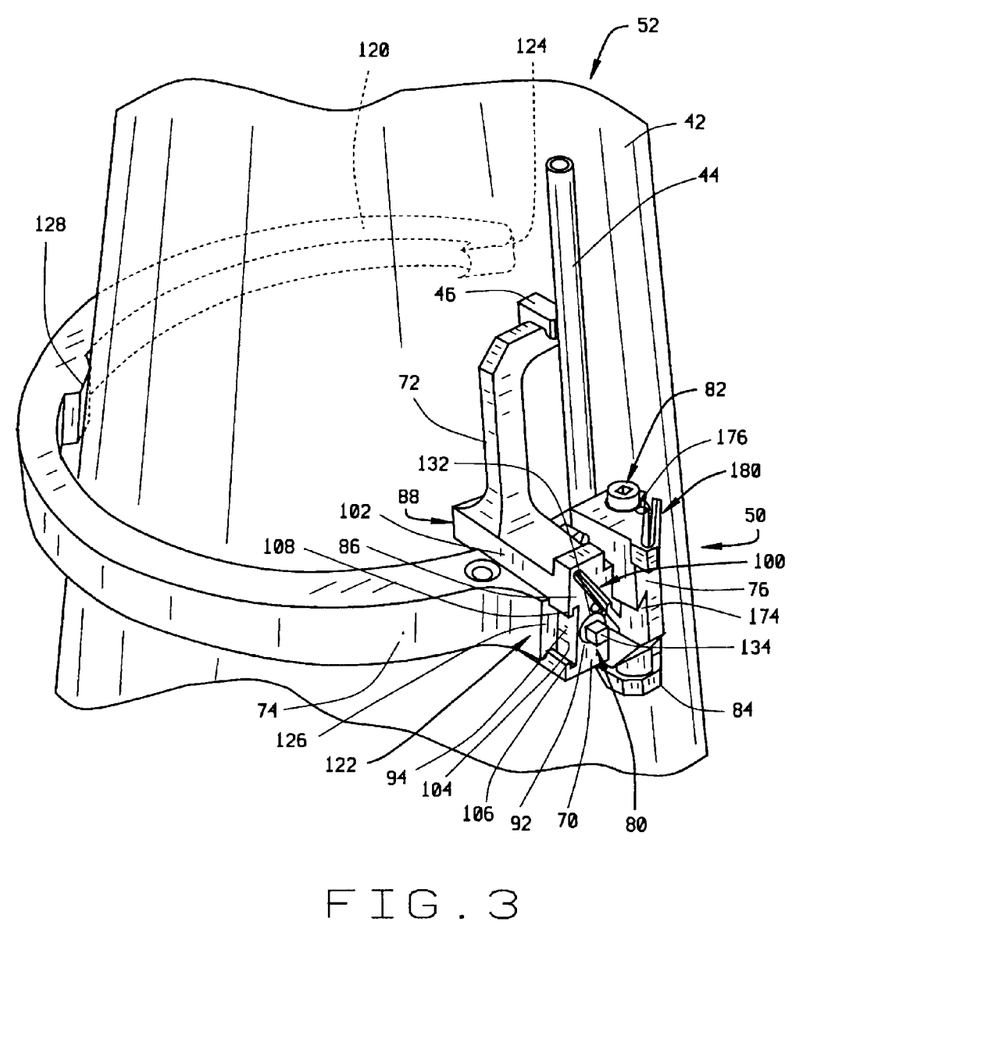
FIG. 3 is a side perspective view of the jet pump assembly shown in FIG. 1.
Figure 4:
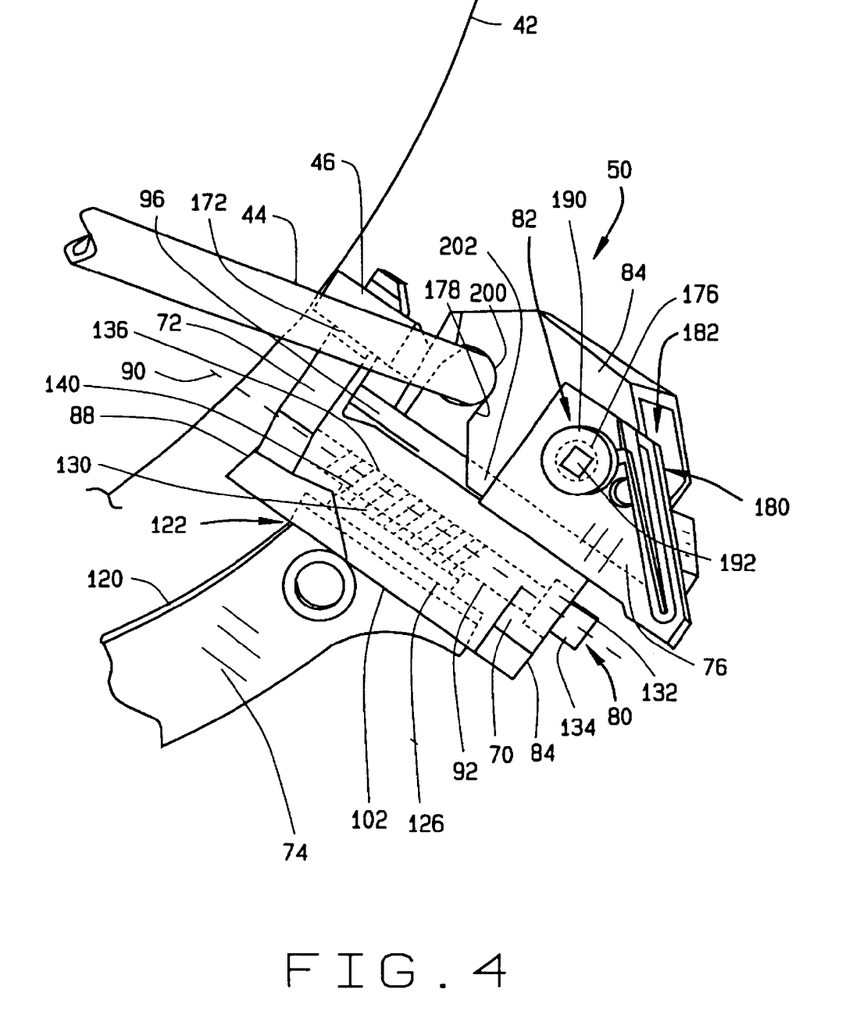
FIG. 4 is a top perspective view of the jet pump assembly shown in FIG. 1.

FIG. 3 is a side perspective view of jet pump assembly 52, and FIG. 4 is a top perspective view of jet pump assembly 52. Referring to FIGS. 3 and 4, clamp assembly 50 includes a clamp body 70, a clamp strut 72 extending from clamp body 70, a clamp member 74 coupled to clamp body 70, and a slide member 76 coupled to clamp body 70. Clamp assembly 50 further includes a clamp bolt 80, a swing arm bolt 82, and a swing arm 84 coupled to slide member 76.

Clamp body 70 includes an outer end 86, an inner end 88, and an axis 90 extending from outer end 86 to inner end 88. Inner end 88 is configured to contact diffuser 42. In one embodiment, inner end 88 is contoured to conform to diffuser 42. Clamp body 70 also includes a bolt cavity 92, a T-slot 94, a dovetail 96, and a locking device 100 adjacent bolt cavity 92. Bolt cavity 92 extends from outer end 86 towards inner end 88 substantially parallel to axis 90. T-slot 94 is formed on a first side 102 of clamp body 70 and is substantially parallel to axis 90. T-slot 94 includes a center channel 104 and a pair of opposed extended tabs 106 and 108 to facilitate the slidable coupling and retention of clamp member 74. T-slot 94 extends into bolt cavity 92. More specifically, at least a portion of bolt cavity 92 is open to center channel 104. In another embodiment a dovetail slot or a C-slot is used in place of T-slot 94 Clamp body dovetail 96 extends from clamp body 70 generally opposite from T-slot 94. Dovetail 96 slidably couples clamp body 70 to slide member 76.

Clamp member 74 includes an inner surface 120, a first end 122, and a second end 124, with clamp member 74 extending partially around diffuser 42. Clamp member inner surface 120 includes at least one pad 128 contoured to provide a raised local contact at a predetermined location against diffuser 42. Clamp member first end 122 includes a T-tongue 126 sized to slidably engage in T-slot 94. Clamp member T-tongue 126 includes a plurality of clamping threads 130 extending into clamp body bolt cavity 94.

Clamp bolt 80 includes a clamp bolt head 132, an operator portion 134 extending from bolt head 132, and a shaft 136 extending from bolt head 132. Shaft 136 includes a threaded portion 140. Clamp bolt 80 is sized to be received in clamp body bolt cavity 92 and to engage T-tongue clamping threads 130. More specifically, threaded portion 140 engages T-tongue clamping threads 130.

Figure 5:
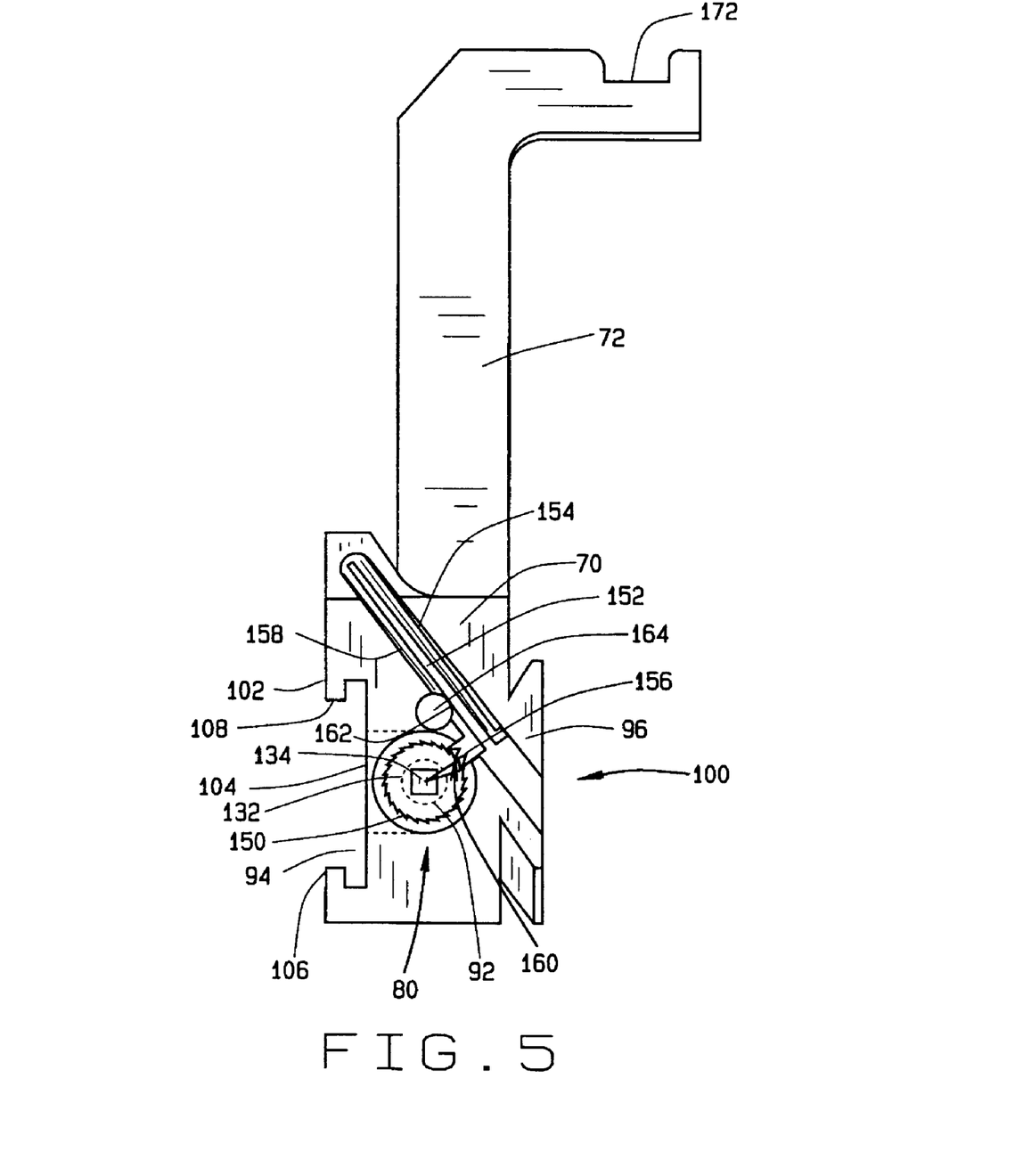
FIG. 5 is a side view of a clamp body shown in FIG. 3 with a ratchet spring removed.
Figure 6:
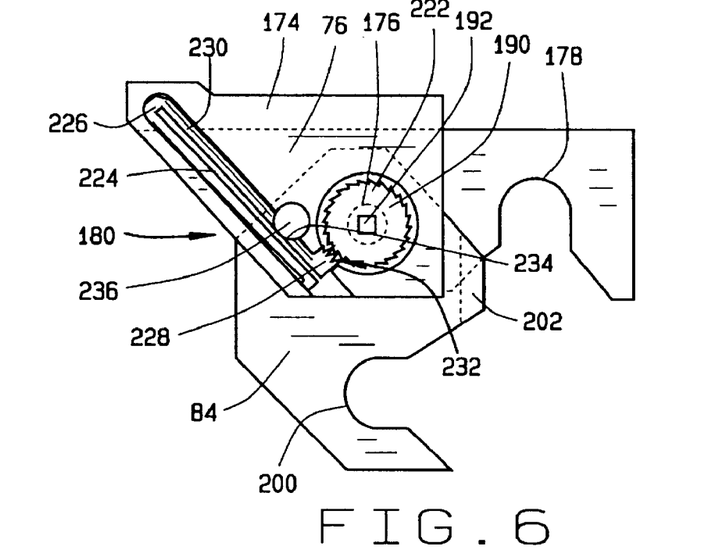
FIG. 6 is a top view of a slide member and a swing arm in an open position, uncoupled from the jet pump assembly.

Referring to FIGS. 4, 5, and 6, clamp assembly 50 includes clamp bolt locking device 100. Clamp bolt locking device 100 includes a plurality of bolt ratchet teeth 150 around the periphery of clamp bolt head 132, a clamp spring cavity 152 within clamp body 70, and a clamp ratchet spring 154. Clamp spring cavity 152 is positioned adjacent bolt cavity 92 and includes a spring aperture 156 that is open to bolt cavity 92.

Clamp ratchet spring 154 includes a side 158 that includes at least one spring ratchet tooth 160. Clamp ratchet spring 156 is sized to be received in spring cavity 152 such that spring ratchet teeth 160 extend from side 158 into spring aperture 156. When positioned in spring aperture 156 spring ratchet teeth 160 engage clamp bolt ratchet teeth 150, permitting a clockwise tightening rotation of bolt head 132 but not a counter clockwise loosening rotation.

Clamp ratchet spring side 158 also includes a spring notch 162 located adjacent ratchet teeth 160. Spring notch 162 is sized to receive a release cam tool (not shown) to deflect spring side 158 to disengage spring ratchet teeth 160 from clamp bolt ratchet teeth 150 in case removal of clamp assembly 50 is needed. A release tool recess 164 is located in clamp body 70 to facilitate access to spring notch 162.

Referring to FIGS. 3 and 4, clamp strut 72 extends from clamp body 70, generally parallel to inner end 88. Clamp strut 72 includes a strut notch 172. Strut notch 172 is sized to receive support block 46. Strut notch 172 facilitates clamp strut 72 engagement with support block 46, providing a fixed positioning feature to locate the new clamp support at the predetermined elevation. Strut notch 72 also prevents clamp assembly 50 from losing preload by shifting upward along tapered diffuser 42.

Figure 7:
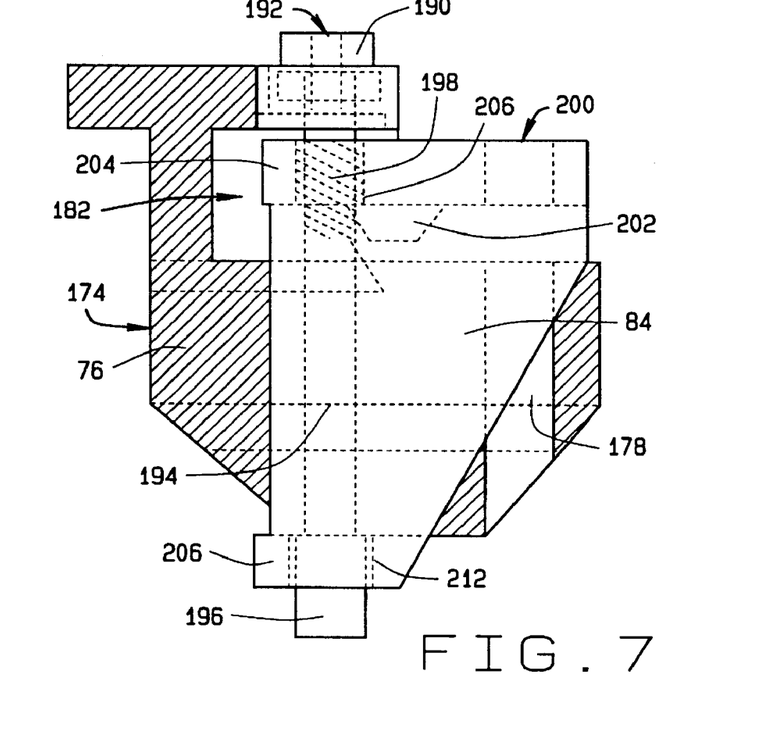
FIG. 7 is a side view of a slide member and a swing arm coupled by a swing arm bolt, in a closed position.

FIG. 6 is a top view of slide member 76 and swing arm 84 in an open position and uncoupled from jet pump assembly 52. FIG. 7 is a side view of slide member 76 and swing arm 84 coupled by swing arm bolt 82, in a closed position. Referring to FIGS. 4, 6 and 7, slide member 76 includes a dovetail slot 174, a bolt receiver 176, a sensing line receiver 178, a swing arm bolt locking device 180, and a slide member cavity 182. Dovetail slot 174 is sized to receive clamp body dovetail 96, and slidably couple slide member 76 and clamp body 70. Slide motion along dovetail slot 174 accommodates radial positional variation of sensing line 44 without imposing misalignment loads or requiring fit-up measurements and machining. Bolt receiver 176 is generally perpendicular to dovetail slot 174 and extend through slide cavity 182. Sensing line receiver 178 is sized to receive sensing line 44. Sensing line receiver 178 conforms to the radius of sensing line 44.

Swing arm bolt 82 is sized to be received in slide bolt receiver 176. Swing arm bolt includes a threaded bolt collar 190, a bolt operator 192 secured to bolt collar 190, a shaft 194, and a bolt end cylinder 196 extending from bolt shaft 194 opposite bolt collar 190. Swing arm shaft 194 includes a threaded portion 198. A right or left hand thread is used with a corresponding clamp configuration such that tightening of swing arm bolt 82 rotates swing arm 84 into contact with sensing line 44, then forces swing arm 84 down into engagement with slide dovetail slot 174. Bolt end cylinder 196 includes a larger circumference than bolt shaft 194 which reacts the swing arm 84 downward preload against the bottom of slide 76 and also acts as a pivot pin for the swing arm 84 offset load. Bolt collar 190 is sized to engage threaded portion 198. Swing arm bolt 82 couples swing arm 84 to slide member 76.

Swing arm 84 includes a sensing line recess 200, a half dovetail segment 202, a first portion 204, and a second portion 206. A threaded swing arm bolt bore 210 extends through first portion 203 and a pivot bore 212 extends through second portion 206. Swing arm first portion 204 is received in slide member cavity 182, while swing arm second portion 206 extends beyond slide member 76. Threaded swing arm bolt bore 210 is sized to engage swing arm shaft threaded portion 198. Pivot bore 212 is sized to permit rotation of swing arm second portion 206, and swing arm 84, around swing arm bolt end cylinder 196.

Swing arm sensing line recess 200 is sized to contact sensing line 44. In one embodiment sensing line recess 200 subtends about half the radius of sensing line 44 and has a contact contour radius slightly larger than the radius of sensing line 44 to accommodate alignment variation of the sensing line axis. This permits application of a tight local clamp support preload without adverse bending of sensing line 44. Sensing line recess 200 and slide member sensing line receiver 178 are sized to secure sensing line 44. More specifically, sensing line recess 200 and slide member sensing line receiver 178 cooperate to clamp sensing line 44.

Clamp assembly 50 includes swing arm bolt locking device 180. Swing arm bolt locking device 180 includes a plurality of bolt collar ratchet teeth 222 that extend around the periphery of bolt collar 190, a slide member spring cavity 224 within slide member 76, and a slide member ratchet spring 226. Slide member spring cavity 224 is positioned adjacent slide member bolt receiver 176 and includes a spring aperture 228 that is open to bolt receiver 176.

Slide member ratchet spring 226 includes a side 230 that includes at least one spring ratchet tooth 232. Slide member ratchet spring 226 is sized to be received in slide member spring cavity 224 such that spring ratchet teeth 232 extend from side 230 into spring aperture 228. When positioned in spring aperture 228 spring ratchet teeth 232 engage bolt collar ratchet teeth 222, restricting movement of bolt collar 190.

Slide member ratchet spring side 230 also includes a spring notch 234 located adjacent spring ratchet teeth 232. Spring notch 234 is sized to receive a release cam tool (not shown) to deflect spring side 230 to disengaged spring ratchet teeth 232 from bolt collar ratchet teeth 222. A release tool recess 236 is located in slide body 76 to facilitate access to spring notch 234.

In use, clamp assembly 50 is lowered in place adjacent diffuser 42, with sensing line 44 proximate to sensing line receiver 178. In one embodiment clamp assembly 50 is lowered with bolt drive mechanisms (not shown) connected to clamp bolt 80 and swing arm bolt 82. In another embodiment, generally to accommodate physical access requirements, bolt drive mechanisms are attached after positioning clamp assembly 50.

Clamp assembly 50 is then positioned to receive sensing line 44 in the slide member 76. More specifically, slide member 76 and swing arm 84 are open, as shown in FIG. 6, and sensing line 44 is received in sensing line receiver 178. Clamp member 74 is positioned around jet pump 34. In the exemplary embodiment, clamp member pads 128 contact diffuser 42. Clamp assembly 50 is positioned such that clamp strut 72 is adjacent support block 46, such that strut notch 172 is aligned to receive support block 46. Clamp assembly 50 is clamped to jet pump 34 by rotating clamp bolt 80. Rotating clamp bolt 80 slides clamp body 70 into contact with jet pump 34. More specifically, rotating clamp bolt 80 drives engagement of clamp member T-tongue clamping threads 130 with threaded portion 140 of clamp bolt shaft 136 such that clamp body inner end 88 contacts diffuser 42. Application of a predetermined bolt torque imparts a clamp preload on diffuser 42 sufficient to avoid loosening from vibratory excitation. Clamp member 74 slides in T-slot 94, clamping diffuser 42 between clamp member inner surface 120 and clamp body inner end 88. Movement of clamp body 70 into contact with jet pump 34 also moves clamp strut 72. As clamp body inner end 88 clamps against jet pump 34, strut notch 172 receives and contacts support block 46. Clamp strut 72 contact with support block 46 restricts vertical movement of clamp assembly 50 relative to jet pump 34. Slide member 76 slides along clamp body dovetail 96, maintaining sensing line 44 in sensing line receiver 178 as clamp bolt is rotated.

Rotating swing arm bolt 82 rotates swing arm 84 into contact with sensing line 44. Sensing line 44 is clamped between swing arm 84 and slide member 76. More specifically, rotation of swing arm bolt collar 190 rotates swing arm bolt 82 and swing arm bolt threaded portion 198 within threaded swing arm bolt bore 210. Swing arm 84 rotates with swing arm bolt 82 until sensing line recess 200 contacts sensing line 44. In the exemplary embodiment sensing line recess 200 contacts sensing line 44 circumferentially opposed to where sensing line receiver 178 contacts sensing line 44. Rotation of swing arm 84 continues until contact with slide 76, which also aligns half dovetail segment 202 above clamp body dovetail 96. Continued rotation of swing arm bolt 82 drives swing arm 84 downward such that half dovetail segment 202 engages the mating inclined face of clamp body dovetail 96, securing swing arm 84 to clamp body 76. Swing arm half dovetail segment 202 engagement with clamp body dovetail 96 restricts movement of swing arm 84 and slide member 76 relative to clamp body dovetail 96. Application of a predetermined bolt torque imparts a downward preload to swing arm 84. The preload is reacted between the mating inclined dovetail surfaces to impart a horizontal wedging force that clamps the opposing sensing line recess 200 tightly to sensing line 44. The wedging forces between the dovetail surfaces also provides frictional locking against motion of slide member 76 with clamp body 70. Clamp assembly 50 clamps sensing line 44 between swing arm 84 and slide member 76, while clamp assembly 50 is clamped to jet pump 34 by clamp member 74 and clamp body 70, which provides a fixed support for sensing line 44.

Clamp bolt locking device 100 and swing arm locking device 180 restrict loosening of clamp bolt 80 and swing arm bolt 82 respectively. Since clamp bolt locking device 100 and swing arm locking device 180 are similar only clamp bolt locking device 100 operation is described. Clamp bolt locking device 100 is movable between a first, or engaged, position where spring ratchet teeth 160 are engaged with bolt ratchet teeth 150, and a second, or disengaged, position where clamp ratchet spring side 158 is deflected by a release cam tool (not shown) inserted in release tool recess 164 and engaging spring notch 162. Deflection of clamp ratchet spring side 158 retracts spring ratchet teeth 160 from spring aperture 156. Spring ratchet teeth 160 are disengaged from bolt ratchet teeth 150. Clamp ratchet spring 154 is machined to produce the desired preload force. The shape of meshing ratchet teeth 150 and 160 permit tightening of clamp bolt 80 with a bolt drive mechanism, but subsequent rotation in the loosening direction is limited by meshed ratchet teeth 150 and 160 to less than one tooth space. Use of close tooth spacing minimizes the corresponding possible variation in bolt position after clamping. The inclined contact surface between meshed ratchet teeth 150 and 160 facilitates bolt tightening while wedging the meshed ratchet teeth 150 and 160 more tightly against loosening rotation, providing a self-energized lock.

Any suitable material can be used for clamp assembly 50, including, for example, Type XM-19 stainless steel. Ni—Cr—Fe alloy X-750 can be used, for example, for bolts 80 and 82 and locking devices 100 and 180. The X-750 alloy provides high strength, permitting minimum size and weight, and resists galling between sliding surfaces. Type XM-19 stainless steel and Ni—Cr—Fe alloy X-750 both provide corrosion resistance in the environment of a boiling water nuclear reactor.

The above described clamping assembly 50 facilitates clamping sensing line 44 to jet pump 34 and the reduction of vibrations in sensing line 44. Additionally, the above described clamping assembly 50 facilities installation with the described bolt locking devices 100 and 180 in a remote access confined space.

While the invention has been described in terms of various specific embodiments, those skilled in the art will recognize that the invention can be practiced with modification within the spirit and scope of the claims.

What is claimed is:

1. A clamp assembly for a jet pump sensing line adjacent a jet pump within a nuclear reactor pressure vessel, the jet pump sensing line comprising a support block, said clamp assembly comprising:
    a clamp body comprising an outer end, an inner end, an axis extending from said outer end to said inner end, and a bolt cavity;
    a clamp member slidably coupled to said clamp body, said clamp member configured to extend partially around the jet pump;
    a clamp bolt comprising a head, said clamp bolt sized to be received in said clamp body bolt cavity;
    a slide member slidably coupled to said clamp body, said slide member comprising a bolt receiver and a sensing line receiver;
    a swing arm bolt sized to be received in said slide member bolt receiver; and
    a swing arm rotatably coupled to said slide member, said swing arm comprising a sensing line recess, said sensing line recess and said slide member sensing line receiver sized to receive and secure the sensing line, said clamp member and said clamp body sized to secure said clamp assembly to the jet pump.

2. A clamp assembly in accordance with claim 1 further comprising a clamp strut extending from said clamp body, said clamp strut comprising a notch sized to receive the sensing line support block.

3. A clamp assembly in accordance with claim 1 wherein said swing arm bolt comprises a bolt collar, a bolt operator secured to said bolt collar, a shaft extending from said bolt collar, said shaft including a threaded portion, and a bolt end cylinder extending from said bolt shaft opposite said bolt collar.

4. A clamp assembly in accordance with claim 1 wherein said clamp member is slidably coupled to said clamp body by a T-tongue engaged in a T-slot, said T-slot substantially parallel to said clamp body axis.

5. A clamp assembly in accordance with claim 1 wherein said clamp member comprises an inner surface, a first end, and a second end, said clamp member first end comprising a threaded portion extending at least partially into said clamp body bolt cavity.

6. A clamp assembly in accordance with claim 1 wherein said clamp member further comprises at least one contact pad extending from said inner surface, said contact pad configured to contact the jet pump.

7. A clamp assembly in accordance with claim 1 further comprising a locking device to restrain rotation of said clamp bolt.

8. A clamp assembly in accordance with claim 7 wherein said locking device comprises:
    a plurality of bolt ratchet teeth around the periphery of said clamp bolt head;
    a spring cavity within said clamp body; and
    a clamp ratchet spring comprising a side including at least one spring ratchet tooth, said ratchet spring sized to be received in said spring cavity such that said at least one spring ratchet tooth engages said clamp bolt ratchet teeth.

9. A clamp assembly in accordance with claim 8 wherein said clamp body further comprises a tool bore adjacent said clamp body spring cavity to facilitate disengagement of said at least one spring ratchet tooth from said clamp bolt head ratchet teeth.

10. A clamp assembly in accordance with claim 1 wherein said clamp body comprises a dovetail slot and said slide member comprises a dovetail sized to engage said dovetail slot.

11. A clamp assembly in accordance with claim 10 wherein said swing arm further comprises a dovetail segment sized to at least partially engage said clamp body dovetail slot.

12. A clamp assembly in accordance with claim 1 wherein said swing arm is rotatably coupled to said slide member by said swing arm bolt.

13. A clamp assembly in accordance with claim 1 wherein said swing arm sensing line recess includes tapered projections configured to abut the sensing line.

14. A clamp assembly in accordance with claim 3 further comprising a locking system to restrain rotation of said swing arm bolt.

15. A clamp assembly in accordance with claim 14 wherein said locking system comprises:
- a plurality of ratchet teeth around the periphery of said swing bolt collar;
- a spring cavity within said slide member; and
- a slide ratchet spring comprising at least one spring ratchet tooth, said ratchet spring sized to be received in said spring cavity such that said at least one spring ratchet tooth engages said swing bolt collar ratchet teeth.

16. A clamp assembly in accordance with claim 15 wherein said slide member further comprises a tool bore within adjacent said slide member spring cavity.

17. A jet pump assembly comprising:
- an inlet mixer;
- a diffuser coupled to said inlet mixer;
- a sensing line positioned adjacent said diffuser by a support block; and
- a clamp assembly comprising:
  - a clamp body comprising an outer end, an inner end, an axis extending from said outer end to said inner end, and a bolt cavity;
  - a clamp member slidably coupled to said clamp body, said clamp member configured to extend partially around the jet pump;
  - a clamp bolt comprising a head, said clamp bolt sized to be received in said clamp body bolt cavity;
  - a slide member slidably coupled to said clamp body, said slide member comprising a bolt receiver and a sensing line receiver;
  - a swing arm bolt sized to be received in said slide member bolt receiver; and
  - a swing arm rotatably coupled to said slide member, said swing arm comprising a sensing line recess, said sensing line recess and said slide member sensing line receiver sized to receive and secure the sensing line, said clamp member and said clamp body sized to secure said clamp assembly to the jet pump.

18. A jet pump assembly in accordance with claim 17 further comprising a clamp strut extending from said clamp body, said clamp strut comprising a notch sized to receive the sensing line support block.

19. A jet pump assembly in accordance with claim 17 wherein said swing arm bolt comprises a bolt collar, a bolt operator secured to said bolt collar, a shaft extending from said bolt collar, said shaft including a threaded portion, and a bolt end cylinder extending from said bolt shaft opposite said bolt collar.

20. A jet pump assembly in accordance with claim 17 wherein said clamp member is slidably coupled to said clamp body by a T-tongue engaged in a T-slot, said T-slot substantially parallel to said clamp body axis.

21. A jet pump assembly in accordance with claim 17 wherein said clamp member comprises an inner surface, a first end, and a second end, said clamp member first end comprising a threaded portion extending at least partially into said clamp body bolt cavity.

22. A jet pump assembly in accordance with claim 17 wherein said clamp member further comprises at least one contact pad extending from said inner surface, said contact pad configured to contact the jet pump.

23. A jet pump assembly in accordance with claim 17 further comprising a locking device to restrain rotation of said clamp bolt, said locking device comprising:
- a plurality of bolt ratchet teeth around the periphery of said clamp bolt head;
- a spring cavity within said clamp body; and
- a clamp ratchet spring comprising a side including at least one spring ratchet tooth, said ratchet spring sized to be received in said spring cavity such that said at least one spring ratchet tooth engages said clamp bolt ratchet teeth.

24. A jet pump assembly in accordance with claim 23 wherein said clamp body further comprises a tool bore adjacent said clamp body spring cavity to facilitate disengagement of said at least one spring ratchet tooth from said clamp bolt head ratchet teeth.

25. A jet pump assembly in accordance with claim 17 wherein said clamp body comprises a dovetail slot and said slide member comprises a dovetail sized to engage said dovetail slot.

26. A jet pump assembly in accordance with claim 25 wherein said swing arm further comprises a dovetail segment sized to at least partially engage said clamp body dovetail slot.

27. A jet pump assembly in accordance with claim 17 wherein said swing arm is rotatably coupled to said slide member by said swing arm bolt.

28. A jet pump assembly in accordance with claim 17 wherein said swing arm sensing line recess includes tapered projections configured to abut the sensing line.

29. A jet pump assembly in accordance with claim 19 further comprising a locking system to restrain rotation of said swing arm bolt, said locking system comprising:
- a plurality of ratchet teeth around the periphery of said swing bolt collar;
- a spring cavity within said slide member; and
- a slide ratchet spring comprising at least one spring ratchet tooth, said ratchet spring sized to be received in said spring cavity such that said at least one spring ratchet tooth engages said swing bolt collar ratchet teeth.

30. A jet pump assembly in accordance with claim 29 wherein said slide member further comprises a tool bore within adjacent said slide member spring cavity.

\* \* \* \* \*